(12) United States Patent
Wang

(10) Patent No.: US 9,742,342 B2
(45) Date of Patent: Aug. 22, 2017

(54) MOTOR DRIVING APPARATUS

(71) Applicant: Jelley Technology Co., Ltd., Hsinchu (TW)

(72) Inventor: Feng-Ho Wang, Hsinchu (TW)

(73) Assignee: Jelley Technology Co., Ltd., Hsinchu (TW)

( * ) Notice: Subject to any disclaimer, the term of this patent is extended or adjusted under 35 U.S.C. 154(b) by 241 days.

(21) Appl. No.: 14/338,465

(22) Filed: Jul. 23, 2014

(65) Prior Publication Data
US 2016/0028293 A1  Jan. 28, 2016

(51) Int. Cl.
*H02P 6/00* (2016.01)
*H02P 29/00* (2016.01)
*H02K 11/00* (2016.01)
*H02P 29/024* (2016.01)
*H02P 7/03* (2016.01)
*H02P 29/60* (2016.01)

(52) U.S. Cl.
CPC ........ *H02P 29/0044* (2013.01); *H02K 11/001* (2013.01); *H02K 11/0073* (2013.01); *H02P 7/04* (2016.02); *H02P 29/027* (2013.01); *H02P 29/60* (2016.02)

(58) Field of Classification Search
CPC ..... H02P 6/085; H02P 7/04; H01H 2009/065; H01H 2231/048; H02H 7/0838

USPC .................................................. 318/400.29
See application file for complete search history.

(56) References Cited

U.S. PATENT DOCUMENTS

| | | | |
|---|---|---|---|
| 2005/0127862 A1* | 6/2005 | Glasgow | B05C 17/00503 318/280 |
| 2009/0145671 A1* | 6/2009 | Filippov | B25J 5/005 180/9.42 |
| 2009/0295313 A1* | 12/2009 | Suzuki | B25F 5/00 318/139 |
| 2012/0090863 A1* | 4/2012 | Puzio | B25B 21/02 173/2 |
| 2012/0279743 A1* | 11/2012 | Suda | B25F 5/001 173/176 |
| 2015/0041164 A1* | 2/2015 | Sergyeyenko | B25B 21/008 173/1 |

\* cited by examiner

*Primary Examiner* — Bickey Dhakal
(74) *Attorney, Agent, or Firm* — Trop Pruner & Hu, P.C.

(57) ABSTRACT

A motor driving apparatus includes: a switch having a first terminal that receives an external voltage, and a second terminal; a driving circuit coupled to the first terminal of the switch, and powered by the external voltage; a control circuit coupled to the second terminal of the switch; and a power circuit coupled across the switch, and outputting an internal voltage associated with the external voltage to power the control circuit to control the driving circuit to drive a motor of a power tool to rotate in a first direction when the switch operates in the ON state and to rotate in a second direction for a predetermined time period counting from each instance the switch transitions to the OFF state.

17 Claims, 4 Drawing Sheets

MOTOR DRIVING APPARATUS

FIELD OF THE INVENTION

This invention relates to a driving apparatus, and more particularly to a motor driving apparatus.

BACKGROUND OF THE INVENTION

A motor driving apparatus may output a large driving current to drive a motor of a power tool. Conventionally, the motor driving apparatus uses a relatively large number of components that can carry a large current, and is thus disadvantageously bulky.

SUMMARY OF THE INVENTION

Therefore, an object of this invention is to provide a motor driving apparatus that can overcome the aforesaid drawback associated with the prior art.

According to this invention, a motor driving apparatus is adapted for driving a motor of a power tool. The motor driving apparatus comprises a switch, a driving circuit, a control circuit and a power circuit. The switch has a first terminal adapted for receiving an external voltage, and a second terminal. The switch is operable between an ON state and an OFF state. The driving circuit is coupled to the first terminal of the switch, and adapted to be coupled to the motor. The driving circuit is powered by the external voltage, and operable to drive the motor to rotate in first and second directions. The control circuit is coupled to the second terminal of the switch and the driving circuit, and is able to control the driving circuit based on an operating state of the switch. The power circuit is coupled across the switch and to the control circuit, receives the external voltage, and selectively outputs, based on the operating state of the switch, an internal voltage associated with the external voltage to power the control circuit. The internal voltage is outputted when the switch operates in the ON state and for a predetermined time period counting from each instance of the switch transitioning from the ON state to the OFF state. The control circuit is powered by the internal voltage from the power circuit to control the driving circuit to drive the motor to rotate in the first direction when the switch operates in the ON state, and to rotate in the second direction for the predetermined time period each time said first switch transitions from the ON state to the OFF state.

BRIEF DESCRIPTION OF THE DRAWINGS

Other features and advantages of this invention will become apparent in the following detailed description of the embodiments of this invention with reference to the accompanying drawings, of which.

DETAILED DESCRIPTION OF THE EMBODIMENTS

Figure 1:
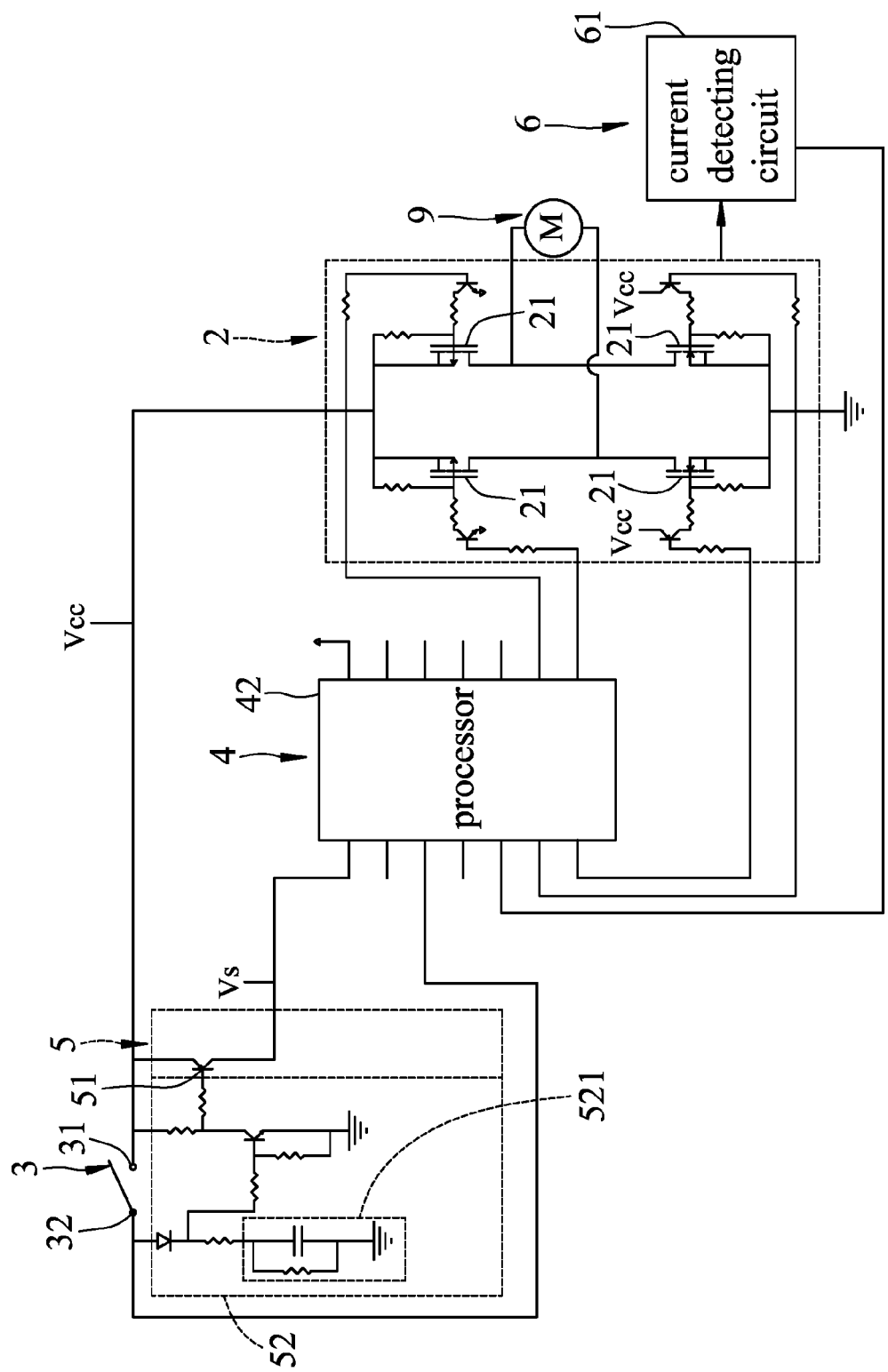
FIG. 1 is a schematic circuit block diagram illustrating the first embodiment of a motor driving apparatus according to this invention.

Before this invention is described in greater detail with reference to the accompanying embodiments, it should be noted herein that like elements are denoted by the same reference numerals throughout the disclosure.

Moreover, it should be noted herein that throughout this disclosure, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 2:
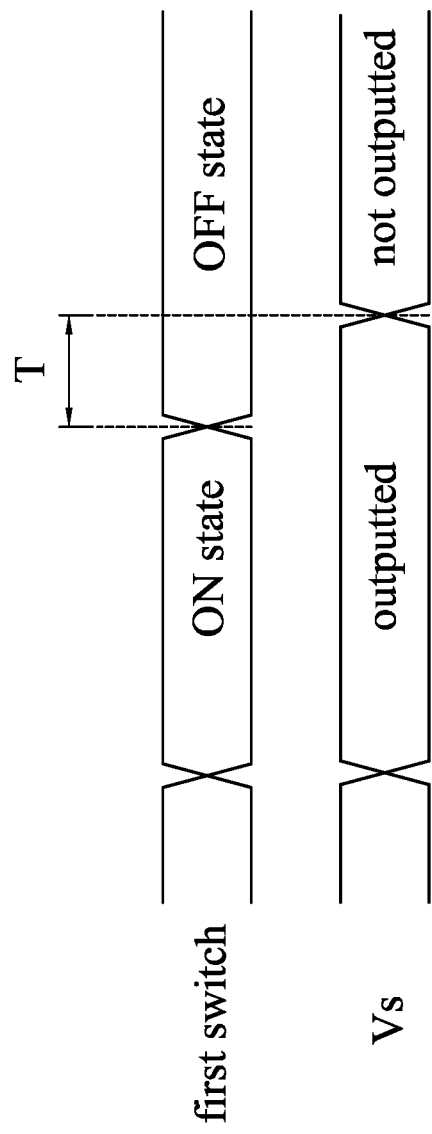
FIG. 2 is a timing diagram illustrating operation of the first embodiment.

Referring to FIGS. 1 and 2, the first embodiment of a motor driving apparatus according to this invention is adapted for driving a motor 9 of a power tool (not shown). The motor driving apparatus includes a first switch 3, a driving circuit 2, a control circuit 4, a power circuit 5 and a detecting module 6.

The first switch 3 has a first terminal 31 that is adapted for receiving an external voltage (Vcc), and a second terminal 32. The first switch 3 is operable between an ON state and an OFF state.

The driving circuit 2 is coupled to the first terminal 31 of the first switch 3, and adapted to be coupled to the motor 9. The driving circuit 2 is powered by the external voltage (Vcc), and operable to drive the motor 9 to rotate in first and second directions. In this embodiment, the driving circuit 2 includes four switching elements 21 that constitute an H bridge. Two of the switching elements 21 are coupled in series between the first terminal 31 of the first switch 3 and ground, and so are the other two of the switching elements 21. Each switching element 21 can carry a large current, and may be, but is not limited to, a relay or a transistor. Since operation of the driving circuit 2 is well known to those skilled in the art, details of the same are omitted herein for the sake of brevity.

The control circuit 4 is coupled to the second terminal 32 of the first switch 3 and the driving circuit 2, and is able to control the driving circuit 2 based at least on an operating state of the first switch 3. In this embodiment, the control circuit 4 is implemented by a processor 42, and the operating state of the first switch 3 is obtained based on a voltage at the second terminal 32 of the first switch 3.

The power circuit 5 is coupled across the first switch 3 and to the control circuit 4, receives the external voltage (Vcc), and selectively outputs, based on the operating state of the first switch 3, an internal voltage (Vs) associated with the external voltage (Vcc) to power the control circuit 4. The internal voltage (Vs) is outputted whenever the first switch 3 operates in the ON state and also for a predetermined time period (T) counting from every instant of the first switch 3 transitioning from the ON state to the OFF state. When powered by the internal voltage (Vs) from the power circuit 5, the control circuit 4 controls the driving circuit 2 to drive the motor 9 to rotate in the first direction when the first switch 3 operates in the ON state and to rotate in the second direction when the first switch 3 operates in the OFF state. In other words, each time the first switch 3 is switched to the ON state, the internal voltage (Vs) is outputted for the entire duration that the first switch 3 remains in the ON state and continually until the end of the predetermined time period (T) after the first switch 3 is switched to the OFF state. As a result, each time the first switch 3 is switched to the OFF state, the motor 9 begins to rotate in the second direction until the predetermined time period (T) elapses.

In this embodiment, the power circuit 5 includes a second switch 51 and a control unit 52. The second switch 51 is coupled between the first terminal 31 of the first switch 3 and the control circuit 4, and receives the external voltage (Vcc). The control unit 52 is coupled to the first and second terminals 31, 32 of the first switch 3 and the second switch 51, and includes an RC element 521 for determining the predetermined time period (T). The control unit 52 controls, based on the operating state of the first switch 3, operation of the second switch 51 between an ON state and an OFF state, such that the second switch 51 operates in the ON state to allow the external voltage (Vcc) to be outputted thereat to serve as the internal voltage (Vs) whenever the first switch 3 operates in the ON state and for the predetermined time period (T) each time the first switch 3 transitions from the ON state to the OFF state.

The detecting module 6 includes a current detecting circuit 61 that is coupled to the driving circuit 2 and to the control circuit 4. The current detecting circuit 61 generates, based on a voltage across one of the switching elements 21 of the driving circuit 2, a current detection signal associated with a current flowing through the motor 9, and outputs the current detection signal to the control circuit 4.

The control circuit 4 controls the driving circuit 2 based further on the current detection signal, such that the current flowing through the motor 9 is reduced when the current with which the current detection signal is associated is greater than a predetermined maximum current value.

For example, assuming that the power tool is a device for dispensing adhesive, when the power tool is activated by a user (i.e., the first switch 3 is switched to the ON state), the second switch 51 is switched to the ON state so that the internal voltage (Vs) begins to be outputted by the power circuit 5 to power the control circuit 4, which in turn controls the driving circuit 2 to drive the motor 9 to rotate in the first direction to dispense the adhesive for the duration that the first switch 3 remains in the ON state. Once the power tool is deactivated by the user (i.e., the first switch 3 is switched to the OFF state), the second switch 51 remains in the ON state so that the internal voltage (Vs) is kept on being outputted to power the control circuit 4 for the duration of the predetermined time period (T), during which the control circuit 4 controls the driving circuit 2 to drive the motor 9 to rotate in the second direction for retracting the adhesive, thereby preventing the adhesive from flowing out of the power tool.

In view of the above, the motor driving apparatus of this embodiment has the following advantages:

1. Since the driving circuit 2 is powered by the external voltage (Vcc) directly, the first and second switches 3, 51 and the control unit 52 can be implemented by components only capable of carrying relatively small currents, which helps reduce the size of the motor driving apparatus.

2. Since the second switch 51 is switched to the OFF state and therefore the internal voltage (Vs) ceases to be outputted to power the control circuit 4 after the first switch 3 has been switched to the OFF state for the predetermined time period (T), unnecessary power consumption by the control circuit 4 can be prevented.

3. Since the control circuit 4 controls the driving circuit 2 based on the operating state of the first switch 3, control logic of the control circuit 4 is relatively simple.

4. Since the control circuit 4 controls the driving circuit 2 to reduce the current flowing through the motor 9 when this current is greater than the predetermined maximum current value, over current of the motor 9 can be prevented.

Figure 3:
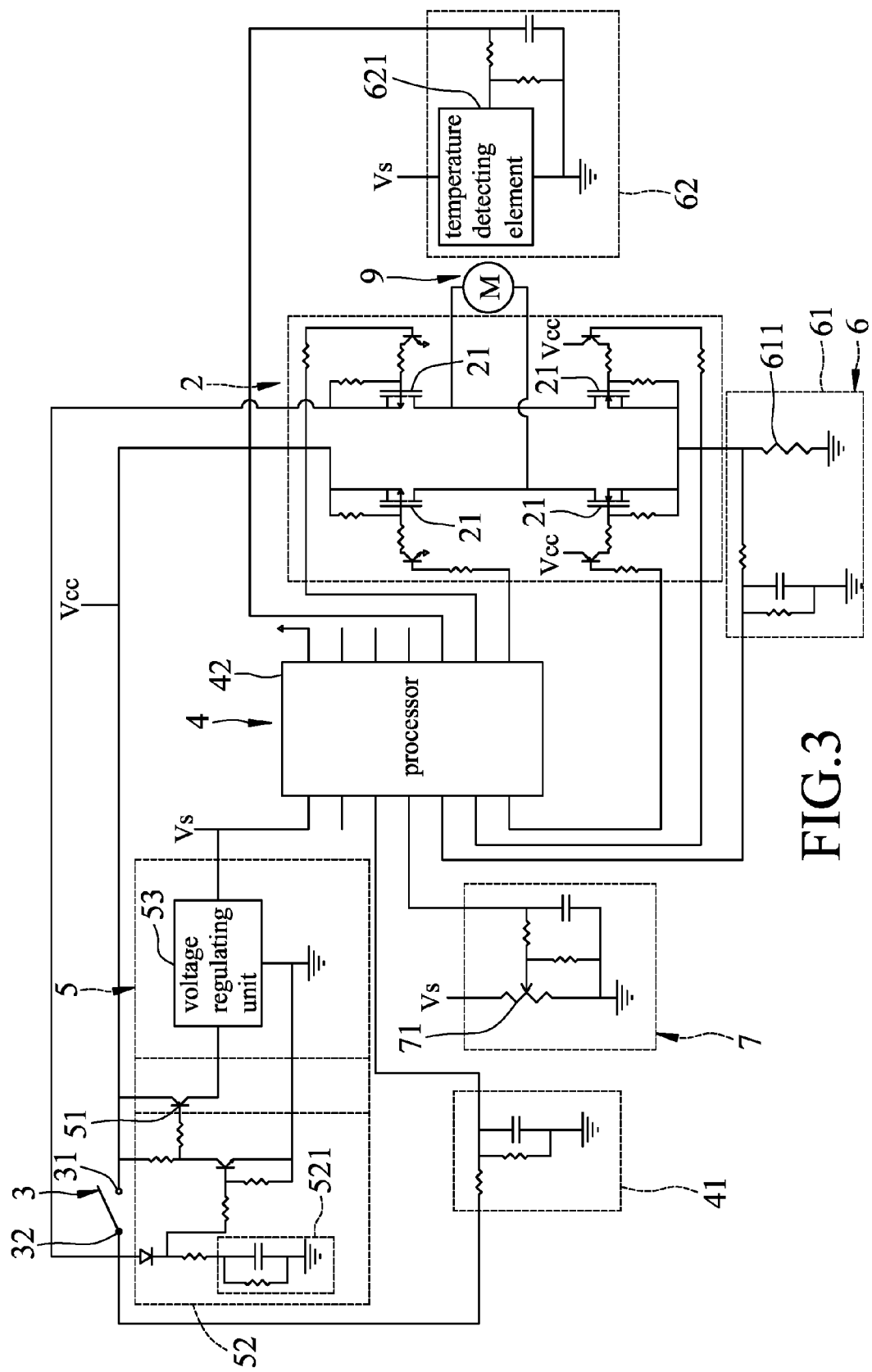
FIG. 3 is a schematic circuit diagram illustrating the second embodiment of a motor driving apparatus according to this invention.

Referring to FIGS. 2 and 3, the second embodiment of a motor driving apparatus according to this invention is a modification of the first embodiment. Unlike the first embodiment, for the driving circuit 2 of the second embodiment, two of the switching elements 21 are coupled in series with the current detecting circuit 61 of the detecting module 6 between the first terminal 31 of the first switch 3 and ground, and the other two of the switching elements 21 are coupled in series with the current detecting circuit 61 of the detecting module 6 between the second terminal 32 of the first switch 3 and ground.

In addition, the control circuit 4 is implemented by a filter 41 in addition to the processor 42. The filter 41 is coupled to the second terminal 32 of the first switch 3, and filters a voltage at the second terminal 32 to generate a filtered voltage. The processor 42 is coupled to the power circuit 5, the filter 41 and the driving circuit 2, and when powered by the internal voltage (Vs) from the power circuit 5, controls the driving circuit 2 based at least on the filtered voltage from the filter 41 such that the driving circuit 2 drives the motor 9 to rotate in the first direction when the filtered voltage indicates that the first switch 3 operates in the ON state (i.e., the filtered voltage is sufficiently high) and to rotate in the second direction when the filtered voltage indicates that the first switch 3 operates in the OFF state (i.e., the filtered voltage is sufficiently low).

The power circuit 5 further includes a voltage regulating unit 53. The second switch 51 is coupled to the first terminal 31 of the first switch 3, and receives the external voltage (Vcc). The control unit 52 is coupled to the first and second terminals 31, 32 of the first switch 3 and the second switch 51, and controls, based on the operating state of the first switch 3, operation of the second switch 51 between the ON state and the OFF state such that the second switch 51 operates in the ON state so that the external voltage (Vcc) is outputted thereat whenever the first switch 3 operates in the ON state and for the predetermined time period (T) whenever the first switch 3 switches into the OFF state. The voltage regulating unit 53 is coupled to the second switch 51 and the processor 42 of the control circuit 4, receives the external voltage (Vcc) through the second switch 51, and regulates the received external voltage (Vcc) to generate the internal voltage (Vs) for powering the processor 42 of the control circuit 4. The voltage regulating unit 53 may be, but is not limited to, a voltage regulating chip, a transistor voltage regulator or a diode voltage regulator.

The detecting module 6 further includes a temperature detecting circuit 62. The current detecting circuit 61 of the detecting module 6 is coupled to the processor 42 of the control circuit 4, and includes a resistor 611 that is coupled to the driving circuit 2 for receiving the current flowing through the motor 9. The current detecting circuit 61 generates, based on a voltage across the resistor 611, the current detection signal associated with the current flowing through the motor 9, and outputs the current detection signal to the processor 42 of the control circuit 4. The temperature detecting circuit 62 is coupled to the processor 42 of the control circuit 4, and includes a temperature detecting element 621 to be disposed proximate to the motor 9 for detecting a temperature of the motor 9. The temperature detecting circuit 62 generates a temperature detection signal associated with the detected temperature and outputs the same to the processor 42 of the control circuit 4. The temperature detecting element 621 may be, but is not limited to, a thermistor, a temperature switch, a platinum resistor or a temperature sensing chip.

The processor 42 controls the driving circuit 2 based further on the current detection signal and the temperature detection signal, such that the current flowing through the motor 9 is reduced when the current with which the current detection signal is associated is greater than the predetermined maximum current value or when the detected temperature is higher than a predetermined maximum temperature value.

The motor driving apparatus of the second embodiment further includes a voltage input circuit 7 that is coupled to the processor 42 of the control circuit 4, and that outputs a variable control voltage to the processor 42 of the control circuit 4. In this embodiment, the voltage input circuit 7 includes a variable resistor 71 for generating the variable control voltage.

The processor 42 controls the driving circuit 2 based further on the variable control voltage. For example, the processor 42 determines, based on the variable control voltage, at least one operating parameter for the motor 9, such as the predetermined maximum temperature value, the predetermined maximum current value, a rotary speed and an operating time.

In view of the above, the motor driving apparatus of this embodiment has the following advantages:

1. Since the second switch 51 and the control unit 52 can be implemented by components that are only capable of carrying relatively small currents, the size of the motor driving apparatus may be reduced.

2. Since the second switch 51 is switched to the OFF state and the voltage regulating unit 53 stops outputting the internal voltage (Vs) to power the processor 42 when the first switch 3 has been switched to the OFF state for the predetermined time period (T), unnecessary power consumption by the processor 42 can be prevented.

3. Since the processor 42 controls the driving circuit 2 based primarily on the operating state of the first switch 3, the control logic of the processor 42 is relatively simple.

4. Since the processor 42 controls the driving circuit 2 to reduce the current flowing through the motor 9 when this current exceeds the predetermined maximum current value or when the detected temperature is higher than the predetermined maximum temperature value, over current and over temperature of the motor 9 can be prevented.

5. Since the processor 42 determines the operating parameter(s) of the motor 9 based on the variable control voltage from the voltage input circuit 7, it is relatively easy to set the operating parameter (s) of the motor 9 through the voltage input circuit 7.

Figure 4:
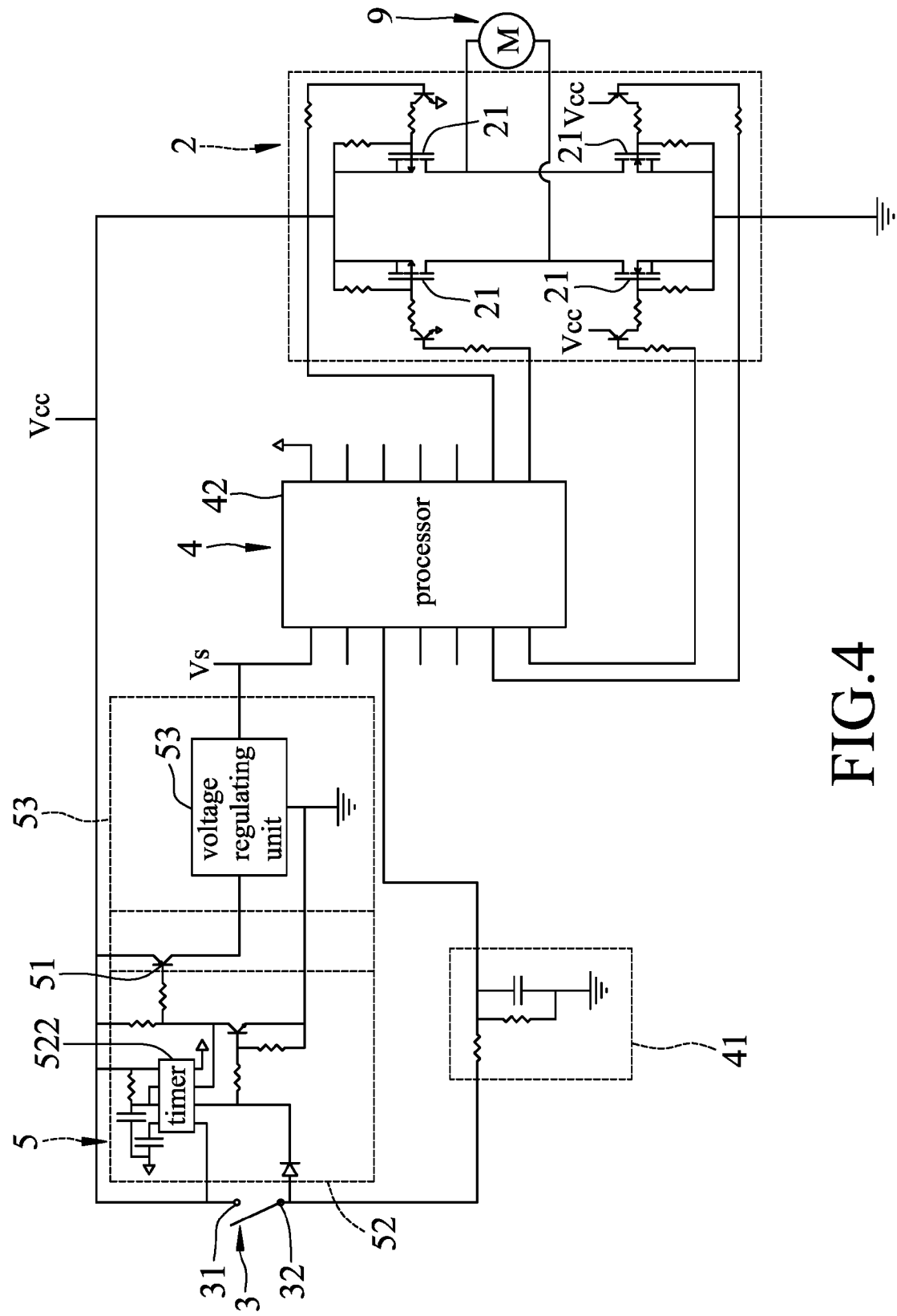
FIG. 4 is a schematic circuit diagram illustrating the third embodiment of a motor driving apparatus according to this invention.

Referring to FIGS. 2 and 4, the third embodiment of a motor driving apparatus according to this invention is a modification of the second embodiment. Unlike the second embodiment, for the driving circuit 2 of the third embodiment, two of the switching elements 21 are coupled in series between the first terminal 31 of the first switch 3 and ground, and so are the other two of the switching elements 21.

In addition, the control unit 52 of the power circuit 5 includes a timer 522, instead of the RC element 521 (see FIG. 3), for determining the predetermined time period (T). The detecting module 6 (see FIG. 3) and the voltage input circuit 7 (see FIG. 3) are omitted, and so is the corresponding control logic of the processor 42.

While this invention has been described in connection with what are considered the most practical embodiments, it is understood that this invention is not limited to the disclosed embodiments but is intended to cover various arrangements included within the spirit and scope of the broadest interpretation and equivalent arrangements.

What is claimed is:

1. A motor driving apparatus adapted for driving a motor of a power tool, said motor driving apparatus comprising:
   a first switch having a first terminal that is adapted for receiving an external voltage, and a second terminal, said first switch being operable between an ON state and an OFF state;
   a driving circuit coupled to said first terminal of said first switch, and adapted to be coupled to the motor, said driving circuit being powered by the external voltage, and being operable to drive the motor to rotate in first and second directions;
   a control circuit coupled to said second terminal of said first switch and said driving circuit, and configured to control said driving circuit based at least on an operating state of said first switch; and
   a power circuit coupled across said first switch and to said control circuit, receiving the external voltage, and selectively outputting, based on the operating state of said first switch, an internal voltage associated with the external voltage to power said control circuit, the internal voltage being outputted when said first switch operates in the ON state and for a predetermined time period counting from every instant of said first switch transitioning from the ON state to the OFF state;
   wherein said control circuit is powered by the internal voltage to control said driving circuit to drive the motor to rotate in the first direction when said first switch operates in the ON state, and to rotate in the second direction for the predetermined time period each time said first switch transitions from the ON state to the OFF state;
   wherein said power circuit includes
   a second switch coupled between said first terminal of said first switch and said control circuit, and receiving the external voltage; and
   a control unit coupled to said second terminal of said first switch and said second switch, and controlling, based on the operating state of said first switch, operation of said second switch between an ON state and an OFF state such that said second switch operates in the ON state to permit output of the external voltage thereat to serve as the internal voltage for the duration that said first switch operates in the ON state and until the end of the predetermined time period after said first switch transitions from the ON state to the OFF state.

2. The motor driving apparatus of claim 1, wherein said control circuit includes:
   a filter coupled to said second terminal of said first switch, and filtering a voltage at said second terminal to generate a filtered voltage; and
   a processor coupled to said filter and said driving circuit, and when powered by the internal voltage from said power circuit, controlling said driving circuit based on the filtered voltage from said filter such that said driving circuit drives the motor to rotate in the first direction when the filtered voltage indicates that said first switch operates in the ON state and to rotate in the second direction when the filtered voltage indicates that said first switch operates in the OFF state.

3. The motor driving apparatus of claim 1, further comprising a current detecting circuit that is coupled to said control circuit, and that includes a resistor coupled to said driving circuit for receiving a current flowing through the motor, said current detecting circuit generating, based on a voltage across said resistor, a current detection signal associated with the current flowing through the motor, and outputting the current detection signal to said control circuit.

4. The motor driving apparatus of claim 1, wherein said driving circuit includes four switching elements that constitute an H bridge.

5. The motor driving apparatus of claim 4, further comprising a current detecting circuit coupled to said driving circuit and to said control circuit, said current detecting circuit generating, based on a voltage across one of said switching elements of said driving circuit, a current detection signal associated with a current flowing through the motor, and outputting the current detection signal to said control circuit.

6. The motor driving apparatus of claim 4, wherein two of said switching elements are coupled in series between said first terminal of said first switch and ground, and the other two of said switching elements are coupled in series between said first terminal of said first switch and ground.

7. The motor driving apparatus of claim 4, wherein two of said switching elements are coupled in series between said first terminal of said first switch and ground, and the other two of said switching elements are coupled in series between said second terminal of said first switch and ground.

8. The motor driving apparatus of claim 1, wherein said power circuit includes an RC element for determining the predetermined time period.

9. The motor driving apparatus of claim 1, further comprising a temperature detecting circuit that is coupled to said control circuit, that detects a temperature of the motor, that generates a temperature detection signal associated with the detected temperature, and that outputs the temperature detection signal to said control circuit.

10. The motor driving apparatus of claim 1, further comprising a voltage input circuit that is coupled to said control circuit, and that outputs a variable control voltage to said control circuit.

11. The motor driving apparatus of claim 10, wherein said voltage input circuit includes a variable resistor for generating the variable control voltage.

12. The motor driving apparatus of claim 11, wherein said control circuit controls said driving circuit based further on the variable control voltage.

13. The motor driving apparatus of claim 12, wherein said control circuit determines, based on the variable control voltage, at least one operating parameter for the motor.

14. The motor driving apparatus of claim 13, wherein the operating parameter is one of a maximum temperature value, a maximum current value, a rotary speed and an operating time.

15. A motor driving apparatus adapted for driving a motor of a power tool, said motor driving apparatus comprising:
  a first switch having a first terminal that is adapted for receiving an external voltage, and a second terminal, said first switch being operable between an ON state and an OFF state;
  a driving circuit coupled to said first terminal of said first switch, and adapted to be coupled to the motor, said driving circuit being powered by the external voltage, and being operable to drive the motor to rotate in first and second directions;
  a control circuit coupled to said second terminal of said first switch and said driving circuit, and configured to control said driving circuit based at least on an operating state of said first switch; and
  a power circuit coupled across said first switch and to said control circuit, receiving the external voltage, and selectively outputting, based on the operating state of said first switch, an internal voltage associated with the external voltage to power said control circuit, the internal voltage being outputted when said first switch operates in the ON state and for a predetermined time period counting from every instant of said first switch transitioning from the ON state to the OFF state;
  wherein said control circuit is powered by the internal voltage to control said driving circuit to drive the motor to rotate in the first direction when said first switch operates in the ON state, and to rotate in the second direction for the predetermined time period each time said first switch transitions from the ON state to the OFF state;
  wherein said power circuit includes
    a second switch coupled to said first terminal of said first switch, and receiving the external voltage,
    a control unit coupled to said second terminal of said first switch and said second switch, and controlling, based on the operating state of said first switch, operation of said second switch between an ON state and an OFF state such that said second switch operates in the ON state to allow output of the external voltage thereat for the duration that said first switch operates in the ON state and until the end of the predetermined time period after said first switch transitions from the ON state to the OFF state, and
    a voltage regulating unit coupled to said second switch and said control circuit, receiving the external voltage outputted at said second switch, and regulating the received external voltage to generate the internal voltage.

16. A motor driving apparatus adapted for driving a motor of a power tool, said motor driving apparatus comprising:
  a first switch having a first terminal that is adapted for receiving an external voltage, and a second terminal, said first switch being operable between an ON state and an OFF state;
  a driving circuit coupled to said first terminal of said first switch, and adapted to be coupled to the motor, said driving circuit being powered by the external voltage, and being operable to drive the motor to rotate in first and second directions;
  a control circuit coupled to said second terminal of said first switch and said driving circuit, and configured to control said driving circuit based at least on an operating state of said first switch; and
  a power circuit coupled across said first switch and to said control circuit, receiving the external voltage, and selectively outputting, based on the operating state of said first switch, an internal voltage associated with the external voltage to power said control circuit, the internal voltage being outputted when said first switch operates in the ON state and for a predetermined time period counting from every instant of said first switch transitioning from the ON state to the OFF state;
  wherein said control circuit is powered by the internal voltage to control said driving circuit to drive the motor to rotate in the first direction when said first switch operates in the ON state, and to rotate in the second direction for the predetermined time period each time said first switch transitions from the ON state to the OFF state;
  wherein said control circuit includes a filter coupled to said second terminal of said first switch, and filtering a voltage at said second terminal to generate a filtered voltage, and a processor coupled to said filter and said driving circuit, and when powered by the internal voltage from said power circuit, controlling said driving circuit based on the filtered voltage from said filter such that said driving circuit drives the motor to rotate in the first direction when the filtered voltage indicates that said first switch operates in the ON state and to rotate in the second direction when the filtered voltage indicates that said first switch operates in the OFF state.

17. A motor driving apparatus adapted for driving a motor of a power tool, said motor driving apparatus comprising:

a first switch having a first terminal that is adapted for receiving an external voltage, and a second terminal, said first switch being operable between an ON state and an OFF state;

a driving circuit coupled to said first terminal of said first switch, and adapted to be coupled to the motor, said driving circuit being powered by the external voltage, and being operable to drive the motor to rotate in first and second directions;

a control circuit coupled to said second terminal of said first switch and said driving circuit, and configured to control said driving circuit based at least on an operating state of said first switch; and a power circuit coupled across said first switch and to said control circuit, receiving the external voltage, and selectively outputting, based on the operating state of said first switch, an internal voltage associated with the external voltage to power said control circuit, the internal voltage being outputted when said first switch operates in the ON state and for a predetermined time period counting from every instant of said first switch transitioning from the ON state to the OFF state;

wherein said control circuit is powered by the internal voltage to control said driving circuit to drive the motor to rotate in the first direction when said first switch operates in the ON state, and to rotate in the second direction for the predetermined time period each time said first switch transitions from the ON state to the OFF state;

wherein said power circuit includes a resistor-capacity element (RC element) for determining the predetermined time period.

* * * * *